(12) United States Patent
Zhang

(10) Patent No.: US 12,476,550 B2
(45) Date of Patent: Nov. 18, 2025

(54) POWER SUPPLY CIRCUIT AND SYSTEM

(71) Applicant: OUR UNITED CORPORATION, Xi'an (CN)

(72) Inventor: Shenglin Zhang, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 358 days.

(21) Appl. No.: 18/169,369

(22) Filed: Feb. 15, 2023

(65) Prior Publication Data
US 2023/0253889 A1 Aug. 10, 2023

(30) Foreign Application Priority Data
Dec. 16, 2021 (CN) .......................... 202111547526.8

(51) Int. Cl.
| | | |
|---|---|---|
| H02M 3/335 | (2006.01) | |
| H02J 9/06 | (2006.01) | |
| H02M 1/12 | (2006.01) | |
| H02M 7/48 | (2007.01) | |

(52) U.S. Cl.
CPC ......... *H02M 3/33584* (2013.01); *H02J 9/062* (2013.01); *H02M 1/12* (2013.01); *H02M 7/48* (2013.01)

(58) Field of Classification Search
CPC ...... H02M 3/33584; H02M 1/12; H02M 7/48; H02J 9/062
USPC .......................................................... 363/13
See application file for complete search history.

(56) References Cited

U.S. PATENT DOCUMENTS

| | | | |
|---|---|---|---|
| 2014/0354051 A1* | 12/2014 | Guo ................. | B60L 8/003 |
| | | | 307/26 |
| 2016/0211700 A1* | 7/2016 | Zhang ................. | H02J 7/0068 |
| 2018/0037121 A1* | 2/2018 | Narla .................. | H02J 3/38 |
| 2020/0313441 A1* | 10/2020 | Yang ................... | B60L 55/00 |
| 2020/0395758 A1* | 12/2020 | Tanaka ............... | H02J 3/38 |
| 2021/0234396 A1* | 7/2021 | Ghodke ............... | H02J 9/062 |
| 2021/0265858 A1* | 8/2021 | Antoniazza ......... | H02M 5/4585 |

FOREIGN PATENT DOCUMENTS

| | | |
|---|---|---|
| CN | 202772663 U | 3/2013 |
| CN | 209709691 U | 11/2019 |
| CN | 111384718 A | 7/2020 |
| CN | 113708648 A | 11/2021 |
| CN | 217010422 U | 7/2022 |
| WO | WO2017148013 A1 | 9/2017 |

* cited by examiner

*Primary Examiner* — Yemane Mehari
(74) *Attorney, Agent, or Firm* — Kolitch Romano Dascenzo Gates LLC

(57) ABSTRACT

Provided are a power supply circuit and a power supply system. In the power supply circuit, a main circuit output module includes a first DC/DC converter and a first DC/AC inverter, and a conversion module is configured to output DC power to the first DC/DC converter according to input AC power. The first DC/DC converter is configured to convert the DC power into a constant DC voltage, and output the constant DC voltage to a first DC/AC inverter. The first DC/AC inverter is configured to acquire first supplied electrical energy by converting the constant DC voltage into AC power, and output the first supplied electrical energy.

13 Claims, 3 Drawing Sheets

POWER SUPPLY CIRCUIT AND SYSTEM

This application is based on and claims priority to Chinese Patent Application No. 202111547526.8, filed on Dec. 16, 2021, and entitled "NOVEL POWER SUPPLY CIRCUIT AND SYSTEM," the disclosure of which is herein incorporated by reference in its entirety.

TECHNICAL FIELD

The present disclosure relates to a power supply circuit and a power supply system.

BACKGROUND OF THE INVENTION

Current power supply systems of large medical equipment mostly employ alternating current-to-alternating current transformers (AC/AC transformers) to convert input mains. The AC/AC transformer is large and heavy, and consequently, the power supply system is bulky.

SUMMARY OF THE INVENTION

The present disclosure is intended to provide a power supply circuit and a power supply system, which solves the problem that the power supply system is bulky.

In one aspect, the present disclosure provides a power supply circuit. The power supply circuit includes a conversion module and a main circuit output module; wherein the main circuit output module includes a first direct current-to-direct current (DC/DC) converter and a first direct current-to-alternating current (DC/AC) inverter, and wherein the conversion module is configured to output, according to input AC power, DC power to the first DC/DC converter; wherein the first DC/DC converter is configured to convert the DC power into a constant DC voltage, and output the constant DC voltage to the first DC/AC inverter, and wherein the first DC/AC inverter is configured to acquire first supplied electrical energy by converting the constant DC voltage into AC power, and output the first supplied electrical energy to first electric equipment.

In some embodiments, the power supply circuit further includes a redundant circuit output module; wherein the redundant circuit output module is configured to:
  in response to the main circuit output module outputting the first supplied electrical energy, output, based on the DC power, second supplied electrical energy to second electric equipment; or
  in response to a failure of the main circuit output module, output, based on the DC power, the second supplied electrical energy to an output terminal of the main circuit output module, wherein the output terminal is connected to the first electric equipment.

In some embodiments, the main circuit output module further includes a charge-discharge unit and an energy storage unit; wherein the charge-discharge unit is configured to:
  in response to the input AC power being input, charge the energy storage unit based on the constant DC voltage; or
  in response to the input AC power being interrupted, output electrical energy stored in the energy storage unit to the first DC/AC inverter.

In some embodiments, the redundant circuit output module includes a second DC/DC converter and a second DC/AC inverter; wherein the second DC/DC converter is configured to convert the DC power into the constant DC voltage, and output the constant DC voltage to the second DC/AC inverter, and wherein the second DC/AC inverter is configured to acquire the second supplied electrical energy by converting the constant DC voltage into AC power, and output the second supplied electrical energy.

In some embodiments, the charge-discharge unit includes a third DC/DC converter; wherein the third DC/DC converter is configured to:
  in response to the input AC power being input, charge the energy storage unit based on the constant DC voltage; or
  in response to the input AC power being interrupted, output the electrical energy stored in the energy storage unit to the first DC/AC inverter.

In some embodiments, the energy storage unit includes a battery; wherein the battery is configured to:
  in response to the input AC power being input, store the electrical energy according to a constant DC voltage output by the third DC/DC converter; or
  in response to the input AC power being interrupted, discharge the electrical energy to the first DC/AC inverter by the third DC/DC converter.

In some embodiments, the third DC/DC converter includes a bidirectional DC/DC converter.

In some embodiments, the conversion module includes an AC/DC converter; wherein the AC/DC converter is configured to convert the input AC power into the DC power, and output the DC power to the first DC/DC converter.

In some embodiments, the power supply circuit further includes a filter module; wherein the filter module is configured to filter the input AC power, and output the filtered input AC power to the conversion module.

In another aspect, the present disclosure further provides a power supply system. The power supply system includes a power grid and a power supply circuit as described above, wherein the power supply circuit is configured to output supplied electrical energy according to input AC power Output by the power grid.

Compared with the related art, the power supply circuit according to the present disclosure achieves voltage conversion by employing the DC/DC converter, and the size and weight of the power supply system are reduced because of the small size and light weight of the DC/DC converter.

DETAILED DESCRIPTION

Specific embodiments of the present disclosure provide a power supply circuit and a power supply system, which solve the problem that the power supply system is bulky.

For clearer and more definite descriptions of the principles, technical solutions, and effects of the present disclosure, the present disclosure is described in further detail hereinafter with reference to the accompanying drawings and some specific embodiments. It should be understood that the specific embodiments described herein are only intended to explain the present disclosure instead of causing any limitation thereto.

Figure 1:
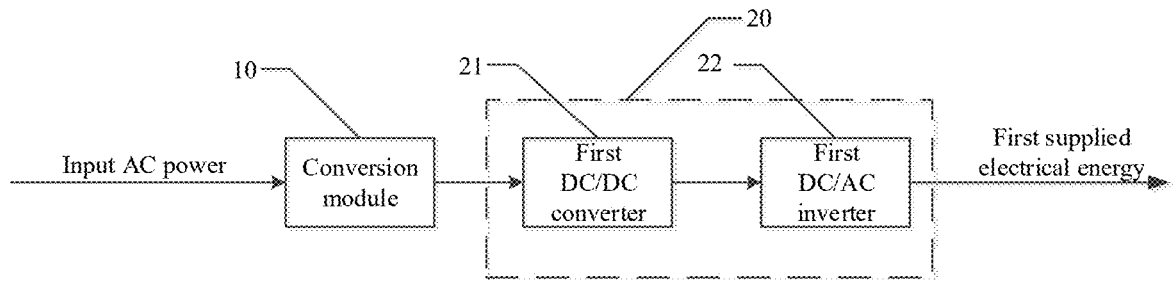
FIG. 1 is a structural block diagram of a power supply circuit according to a first embodiment of the present disclosure.

FIG. 1 is a structural block diagram of a power supply circuit according to a first embodiment of the present disclosure. Referring to FIG. 1, in this embodiment, the power supply circuit includes a conversion module 10 and a main circuit output module 20. The conversion module 10 is connected to a power grid (not illustrated in FIG. 1) and is connected to the main circuit output module 20. The main circuit output module 20 is further connected to external electric equipment (not illustrated in FIG. 1). The power grid supplies input alternating current (AC) power to the conversion module 10, and the main circuit output module 20 supplies electrical energy (e.g., first supplied electrical energy as illustrated in FIG. 1) to the external electric equipment.

The main circuit output module 20 includes a direct current-to-direct current converter (DC/DC converter). The DC/DC converter is hereinafter referred to as a first DC/DC converter. The main circuit output module 20 further includes a first alternating direct current-to-alternating current (DC/AC) inverter 22. The conversion module 10 is configured to output, based on the input AC power, DC power to the first DC/DC converter 21. The conversion module 10 converts the input AC power into the DC power, and outputs the DC power to the first DC/DC converter 21. The first DC/DC converter 21 is configured to convert the DC power into a constant DC voltage, and output the constant DC voltage to the first DC/AC inverter 22. The first DC/AC inverter is configured to acquire first supplied electrical energy by converting the constant DC voltage into AC power, and output the first supplied electrical energy.

In this embodiment, the first DC/DC converter 21 acquires the constant DC voltage by converting the DC power output by the conversion module 10, and the constant DC voltage is determined as a bus voltage for supplying electrical energy to an inversion output component (e.g., the first DC/AC inverter). Due to the small size, light weight, and low no-load loss of the DC/DC converter, the size and weight of the entire power supply system are reduced by deploying the DC/DC converter in the present disclosure.

Figure 2:
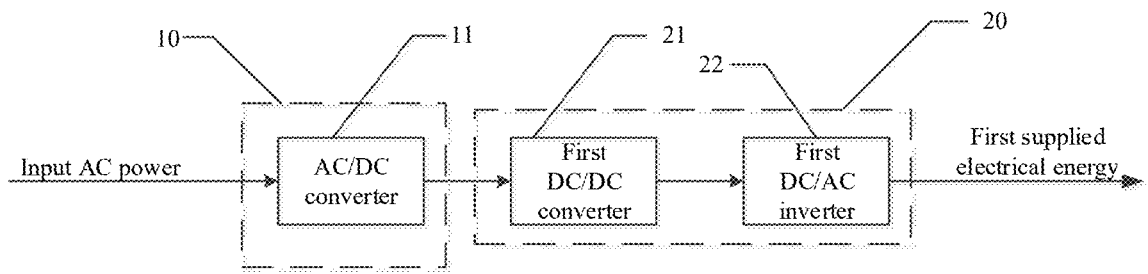
FIG. 2 is a structural block diagram of a conversion module in the power supply circuit according to the first embodiment of the present disclosure.

FIG. 2 is a structural block diagram of a conversion module in the power supply circuit according to the first embodiment of the present disclosure. Referring to FIG. 2, the conversion module 10 includes an AC/DC converter 11. The AC/DC converter 11 is configured to convert the input AC power into the DC power, and output the DC power to the first DC/DC converter 21. During converting the input AC power into the DC power and outputting the DC power to the first DC/DC converter 21 by the AC/DC converter 11 in this embodiment, distortion current and harmonic interference of power grid current are effectively filtered, such that power quality of the power grid is improved, and thus stability of the DC power is effectively ensured.

A power supply circuit in a current power supply system employs an AC/AC transformer, and the AC/AC transformer, in a case of multi-power inputs, requires a complex connector to connect to the multi-power. The power supply circuit in the present disclosure is capable of converting the multi-power inputs into a single voltage input by deploying the DC/DC converter, and whichever an input voltage is, the input voltage is first converted into DC power and then a voltage transformation process is performed on the DC power. Therefore, compared with the current power supply system, an input voltage range of a power supply is expanded and an input connection of the power supply is simplified. In some embodiments, the first DC/DC converter 21 in this embodiment is an isolated DC/DC converter, and interference of a load side and a power side is effectively isolated by deploying the isolated DC/DC converter.

Figure 3:
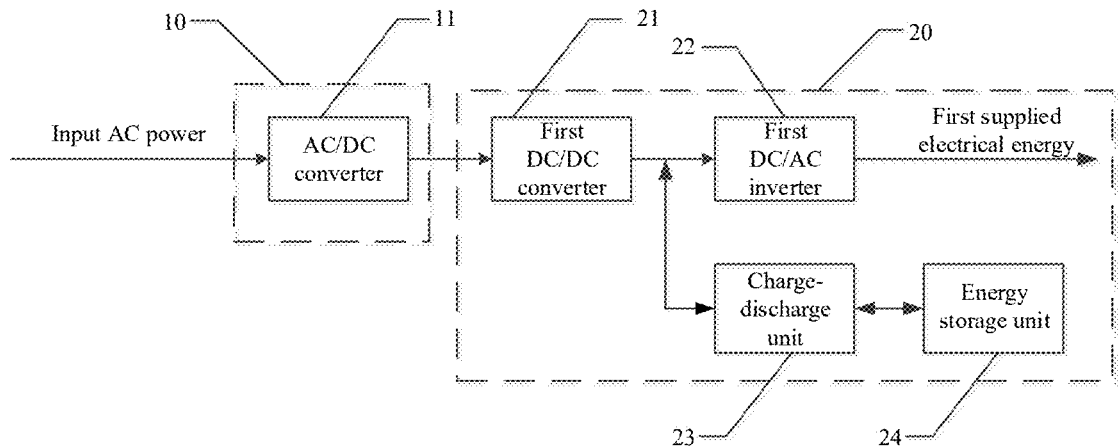
FIG. 3 is a structural block diagram of a power supply circuit according to a second embodiment of the present disclosure.

FIG. 3 is a structural block diagram of a power supply circuit according to a second embodiment of the present disclosure. Referring to FIG. 3, in this embodiment, the main circuit output module 20 further includes a charge-discharge unit 23 and an energy storage unit 24. The charge-discharge unit 23 is connected to the first DC/DC converter 21, the first DC/AC inverter 22, and the energy storage unit 24. The charge-discharge unit 23 is configured to charge the energy storage unit 24 based on the constant DC voltage output by the first DC/DC converter 21 and is further configured to output electrical energy stored in the energy storage unit 24 to the first DC/AC inverter 22. In this embodiment, the power supply circuit has a DC bus (the DC bus refers to a line of an output terminal of the first DC/DC converter) by employing the DC/DC converter, such that an uninterrupted power supply is achieved by directly adding the charge-discharge unit 23 and the energy storage unit 24 to the power supply circuit.

In the embodiment of the present disclosure, the first DC/AC inverter 22 outputs the first supplied electrical energy upon converting the constant DC voltage output by the first DC/DC converter 21; and meanwhile, the first DC/DC converter 21 outputs a constant DC voltage to charge, by the charge-discharge unit 23, the energy storage unit 24. In this case, the energy storage unit 24 stores the electrical energy. In response to the input AC power being interrupted, the energy storage unit 24 outputs the stored electrical energy to the charge-discharge unit 23, and the charge-discharge unit 23 outputs supplied electrical energy based on the electrical energy output by the energy storage unit 23. In this way, by adding the charge-discharge unit 23 and the energy storage unit 24 to the main circuit output module 20, the main circuit output module 20 is capable of functioning as an uninterrupted power supply (UPS) to supply the uninterrupted power supply to electric equipment. Moreover, compared with a traditional power supply circuit which requires an additional UPS device for energy storage because of lack of DC bus interface, the power supply circuit of the present disclosure employs the DC/DC converter, which enables configuring a DC bus in the system, such that the charge-discharge unit 23 and the energy storage unit 24 can be added directly to the power supply circuit to achieve the uninterrupted power supply.

Figure 4:
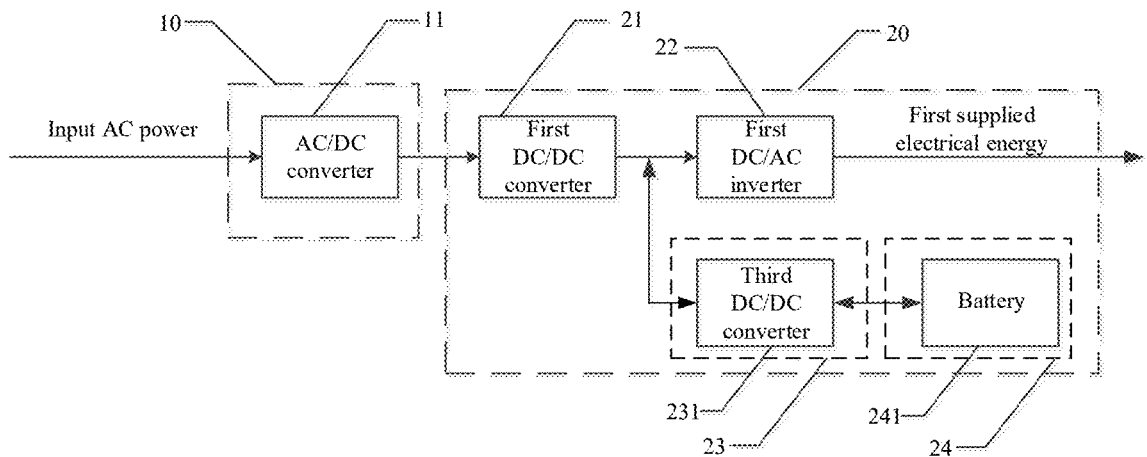
FIG. 4 is a structural block diagram of a charge-discharge unit and an energy storage unit in the power supply circuit according to the second embodiment of the present disclosure.

FIG. 4 is a structural block diagram of a charge-discharge unit and an energy storage unit in the power supply circuit according to the second embodiment of the present disclosure. Referring to FIG. 4, in this embodiment, the charge-discharge unit 23 includes a third DC/DC converter 231. The third DC/DC converter 231 is configured to charge the energy storage unit 24 based on the constant DC voltage or output the electrical energy stored in the energy storage unit 24 to the first DC/AC inverter 22.

The third DC/DC converter 231 in this embodiment includes a bidirectional DC/DC converter. In response to the input AC power being input normally, the first DC/DC converter 21 outputs constant DC voltages respectively to the first AG/DCDC/AC inverter 22 and the bidirectional DC/DC converter. The first DC/AC inverter 22 outputs the supplied electrical energy based on the constant DC voltage, and the bidirectional DC/DC converter charges the energy storage unit 24 based on the constant DC voltage. In response to the input AC power being interrupted, the energy storage unit 24 outputs the stored electrical energy to the first DC/AC inverter 22 by the bidirectional DC/DC converter, such that charge and discharge processes of the energy storage unit 24 are implemented by the bidirectional DC/DC converter. In this case, the main circuit output module 20 implements the function of the UPS by adding the bidirectional DC/DC converter and the energy storage unit 24, and thus an uninterrupted operation of electric equipment for a short time is ensured.

Further, the energy storage unit 24 in this embodiment includes a battery 241. The battery 241 is configured to store electrical energy based on the constant DC voltage output by the third DC/DC converter 231 or discharge the electrical energy to the first DC/AC inverter 22 by the third DC/DC converter 231. In response to the input AC power being input normally, the first DC/DC converter 21 outputs the constant DC voltages respectively to the first AG/DCDC/AC inverter 22 and the bidirectional DC/DC converter. The first DC/AC inverter 22 outputs the supplied electrical energy based on the constant DC voltage, and the bidirectional DC/DC converter charges the battery 241 based on the constant DC voltage. In response to the input AC power being interrupted, the battery 241 outputs the stored electrical energy to the first DC/AC inverter 22 by the bidirectional DC/DC converter. In this case, the main circuit output module 20 implements the function of the UPS by adding the bidirectional DC/DC converter and the battery 241, such that the uninterrupted operation of electric equipment for a short time is ensured.

In this embodiment, by deploying the bidirectional DC/DC converter and the battery 241, the main circuit output module 20 is capable of implementing the function of the UPS. In addition, the main circuit output module in the present disclosure does not have an unstable circuit output compared with a traditional way of separately deploying the UPS. In a traditional circuit, the UPS is deployed separately, the UPS is bypassed when it fails, and the electrical energy is output directly without passing through the UPS. The UPS has a voltage stabilization effect; and if the UPS is bypassed, the effect of voltage stabilization cannot be achieved, resulting in unstable electrical energy output. In the present disclosure, the UPS is not deployed in the traditional way, such that the UPS is not bypassed as it is in the traditional circuit, and thus the electrical energy output is avoided from being unstable. Meanwhile, in the present disclosure, a bidirectional converter and a battery are deployed, such that the main circuit output module 20 is capable of implementing the function of the UPS.

Figure 5:
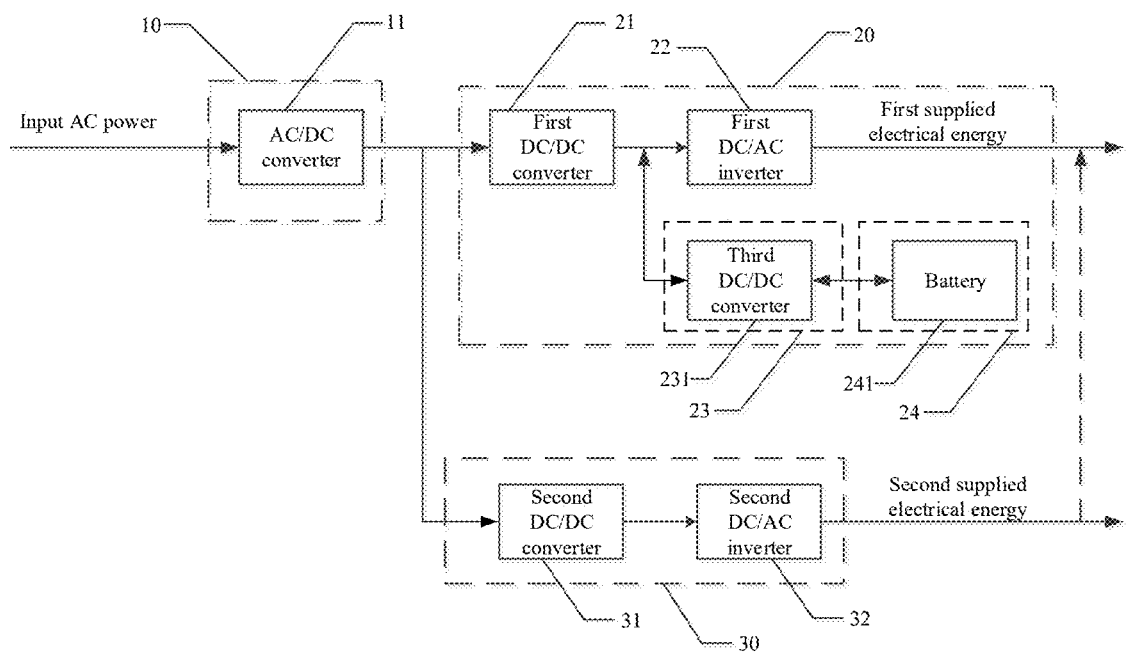
FIG. 5 is a structural block diagram of a power supply circuit according to a third embodiment of the present disclosure.

FIG. 5 is a structural block diagram of a power supply circuit according to a third embodiment of the present disclosure. Referring to FIG. 5, the power supply circuit further includes a redundant circuit output module 30. The redundant circuit output module 30 is connected to the conversion module 10 and is configured to output, based on the DC power output by the conversion module 10, second supplied electrical energy to power the electric equipment. The redundant circuit output module 30 is further configured to output, based on the DC power output by the conversion module 10, the second supplied electrical energy to an output terminal of the main circuit output module 20 in response to a failure of the main circuit output module 20. The output terminal of the main circuit is connected to the first electric equipment.

In response to the main circuit output module 20 operating normally, that is, the main circuit output module 20 outputs the first supplied electrical energy to power first electric equipment, the redundant circuit output module 30 powers second electric equipment (other electric equipment except for the first electric equipment) based on the DC power output by the conversion module 10. The main circuit output module 20 and the redundant circuit output module 30 operate separately from each other.

In response to the failure of the main circuit output module 20, that is, a failure to output the first supplied electrical energy, the redundant circuit output module 30 is employed to the output the second supplied electrical energy. The second supplied electrical energy output by the redundant circuit output module 30 powers the first electric equipment via the output terminal of the main circuit output module 20 and stops powering the second electric equipment, such that stability of the power supply of the main circuit output module 20 is ensured.

In some embodiments, the redundant circuit output module 30 includes a second DC/DC converter 31 and a second DC/AC inverter 32. The second DC/DC converter 31 is connected to the AC/DC converter 11 and the second DC/AC inverter 32. A component connected to the second DC/AC inverter 32 is switched between the external electric equipment (e.g., the second electric equipment) and the output terminal of the main circuit output module 20. The second DC/DC converter 31 is configured to convert DC power into a constant DC voltage, and output the constant DC voltage to the second DC/AC inverter 32, and the second DC/AC inverter 32 is configured to acquire the second supplied electrical energy by converting the constant DC voltage into AC power, and output the second supplied electrical energy. In this embodiment, by deploying the second DC/DC converter 31 and the second DC/AC inverter 32 in the power supply circuit as the redundant circuit output module 30, in response to the failure of the main circuit output module 20, that is, the failure to output the electrical energy, the redundant circuit output module 30 is switched to output the second supplied electrical energy, such that the stability of the power supply of the power supply circuit is ensured.

In some embodiments, the second DC/DC converter 31 in this embodiment is an isolated DC/DC converter. The interference of the load side and the power side is effectively isolated by deploying the isolated DC/DC converter during an operation of the redundant circuit output module.

Figure 6:
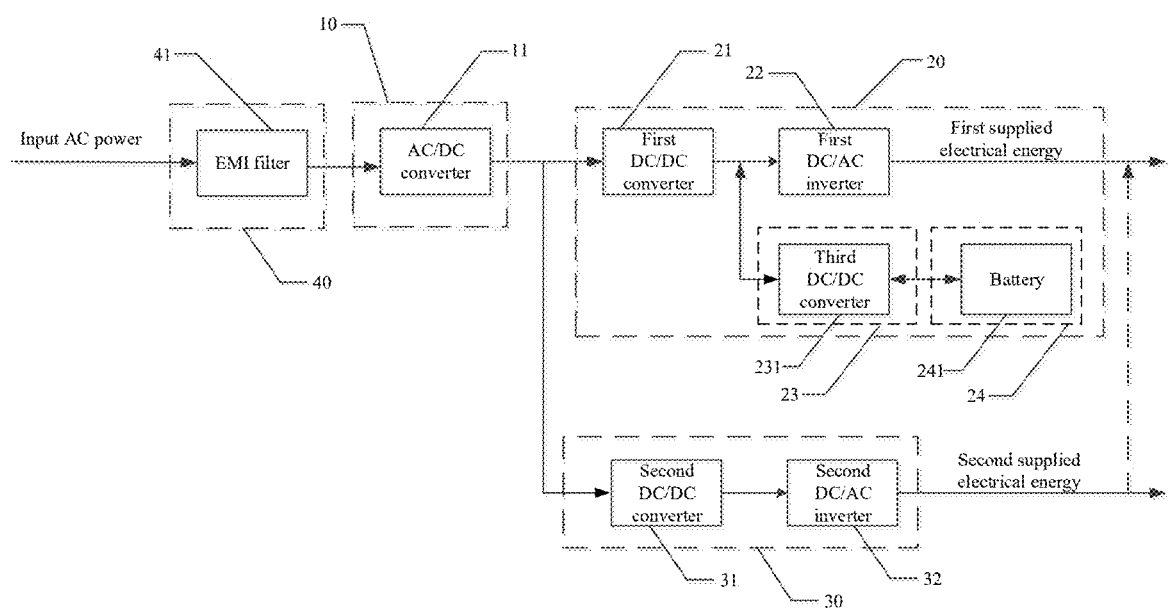
FIG. 6 is a structural block diagram of a power supply circuit according to a fourth embodiment of the present disclosure.

FIG. 6 is a structural block diagram of a power supply circuit according to a fourth embodiment of the present disclosure. Referring to FIG. 6, the power supply circuit further includes a filter module 40 connected to the AC/DC converter 11. The filter module 40 is configured to filter the input AC power, and output the filtered input AC power to the AC/DC converter 11. The filter module 40 is connected to the power supply circuit where the input AC power has not been input into the AC/DC converter 11, and the filter module 40 acts as a protective circuit. By deploying the filter module 40, the source power is ensured to be safely transmitted to the electric equipment, such that the electric equipment is protected; and an electromagnetic interference (EMI) signal generated by the electric equipment itself is effectively controlled, such that the EMI signal is prevented from entering the power grid and contaminating the electromagnetic environment and causing risks to other equipment.

In some embodiments, the filter module 40 includes an EMI filter 41 that is connected to the AC/DC converter 11. The EMI filter 41 is configured to filter the input AC power, and output the filtered input AC power to the AC/DC converter 11. In the illustrated embodiment in FIG. 6, the AC power is first input into the EMI filter 41 and then input into the AC/DC converter 11. The EMI filter 41 acts as a protective circuit. By deploying the EMI filter 41, the source power is ensured to be safely transmitted to the electric equipment, such that the electric equipment is protected; and the electromagnetic interference (EMI) signal generated by the electric equipment itself is effectively controlled, such that the EMI signal is prevented from entering the power grid, which pollutes the electromagnetic environment and harms other equipment.

Some embodiments of the present disclosure further provide a power supply system including a power grid and the power supply circuit as described above. The power supply circuit is configured to output supplied electrical energy according to AC power output by the power grid to supply electrical energy to external electric equipment. A DC/DC converter is employed in the power supply circuit for voltage conversion. Due to the small size, light weight, and low no-load loss of the DC/DC converter, the size and weight of the power supply system are reduced. The power supply circuit is described in detail above, which is not repeated herein.

In summary, the embodiments of the present disclosure provide a power supply circuit and a power supply system. The power supply circuit includes the conversion module and the main circuit output module. The main circuit output module includes the first DC/DC converter and the first DC/AC inverter. The conversion module is configured to output the DC power to the first DC/DC converter based on the input AC power. The first DC/DC converter is configured to convert the DC power into the constant DC voltage and output the constant DC voltage to the first DC/AC inverter. The first DC/AC inverter is configured to acquire the first supplied electrical energy by converting the constant DC voltage into the AC power, and output the first supplied electrical energy. According to the present disclosure, the size and weight of the power supply system are effectively reduced by employing the DC/DC converter for the voltage conversion.

In the embodiments of the present disclosure, the terms "first," "second," and "third" are only used for descriptive purposes, and cannot be understood as indicating or implying relative importance. The term "a plurality of" refers to two or more, unless expressly defined otherwise. The terms "include" and "comprise" are open terms, which should be interpreted as "including but not limited to."

It should be understood that, for those skilled in the art, any equivalent substitutions and modifications may be made in accordance with the technical solutions of the present disclosure and its inventive concept, and all the equivalent substitutions and modifications shall be included in the protection scope of the present disclosure.

What is claimed is:

1. A power supply circuit, comprising:
    a conversion module; and
    a main circuit output module;
    wherein the main circuit output module comprises a first direct current-to-direct current (DC/DC) converter and a first direct current-to-alternating current (DC/AC) inverter, wherein the first DC/DC converter is configured to convert DC power into a constant DC voltage and output the constant DC voltage to the first DC/AC inverter; and wherein the first DC/AC inverter is configured to acquire first supplied electrical energy by converting the constant DC voltage into AC power, and output the first supplied electrical energy to first electric equipment; and
    wherein the conversion module is configured to output, according to input AC power, the DC power to the first DC/DC converter,
    wherein the main circuit output module further comprises a charge-discharge unit and an energy storage unit;
    wherein the charge-discharge unit is configured to:
        in response to the input AC power being input, charge the energy storage unit based on the constant DC voltage; or
        in response to the input AC power being interrupted, output electrical energy stored in the energy storage unit to the first DC/AC inverter.

2. The power supply circuit according to claim 1, further comprising: a redundant circuit output module;
    wherein the redundant circuit output module is configured to:
    in response to the main circuit output module outputting the first supplied electrical energy, output, based on the DC power, second supplied electrical energy to second electric equipment; or
    in response to a failure of the main circuit output module, output, based on the DC power, the second supplied electrical energy to an output terminal of the main circuit output module, wherein the output terminal is connected to the first electric equipment.

3. The power supply circuit according to claim 2, wherein the redundant circuit output module comprises a second DC/DC converter and a second DC/AC inverter;
    wherein the second DC/DC converter is configured to convert the DC power into the constant DC voltage, and output the constant DC voltage to the second DC/AC inverter; and
    wherein the second DC/AC inverter is configured to acquire the second supplied electrical energy by converting the constant DC voltage into AC power, and output the second supplied electrical energy, and an output terminal of the second DC/AC inverter of the redundant circuit output module is directly connected to an output terminal of the first DC/AC inverter of the main circuit output module.

4. The power supply circuit according to claim 1, wherein the charge-discharge unit comprises a third DC/DC converter;
    wherein the third DC/DC converter is configured to:
    in response to the input AC power being input, charge the energy storage unit based on the constant DC voltage; or
    in response to the input AC power being interrupted, output the electrical energy stored in the energy storage unit to the first DC/AC inverter.

5. The power supply circuit according to claim 1, wherein the charge-discharge unit comprises a third DC/DC converter;
    wherein the third DC/DC converter is configured to:
    in response to the input AC power being input, charge the energy storage unit based on the constant DC voltage; or in response to the input AC power being interrupted, output the electrical energy stored in the energy storage unit to the first DC/AC inverter.

6. The power supply circuit according to claim 4, wherein the energy storage unit comprises a battery;
   wherein the battery is configured to:
   in response to the input AC power being input, store the electrical energy according to a constant DC voltage output by the third DC/DC converter; or
   in response to the input AC power being interrupted, discharge the electrical energy to the first DC/AC inverter by the third DC/DC converter.

7. The power supply circuit according to claim 5, wherein the energy storage unit comprises a battery;
   wherein the battery is configured to:
   in response to the input AC power being input, store electrical energy according to a constant DC voltage output by the third DC/DC converter; or
   in response to the input AC power being interrupted, discharge the electrical energy to the first DC/AC inverter by the third DC/DC converter.

8. The power supply circuit according to claim 6, wherein the third DC/DC converter comprises a bidirectional DC/DC converter.

9. The power supply circuit according to claim 7, wherein the third DC/DC converter comprises a bidirectional DC/DC converter.

10. The power supply circuit according to claim 1, wherein the conversion module comprises an AC/DC converter; and wherein the AC/DC converter is configured to convert the input AC power into the DC power, and output the DC power to the first DC/DC converter.

11. The power supply circuit according to claim 1, further comprising: a filter module; wherein the filter module is configured to filter the input AC power, and output the filtered input AC power to the conversion module.

12. The power supply circuit according to claim 2, further comprising: a filter module; wherein the filter module is configured to filter the input AC power, and output the filtered input AC power to the conversion module.

13. A power supply system, comprising a power grid and a power supply circuit as defined in claim 1; wherein the power supply circuit is configured to output supplied electrical energy according to input AC power output by the power grid.

* * * * *